United States Patent
Chen et al.

(10) Patent No.: US 12,151,942 B2
(45) Date of Patent: Nov. 26, 2024

(54) METHOD FOR PREPARING SPHERICAL SILICA POWDER FILLER, AND RESULTING SPHERICAL SILICA POWDER FILLER AND APPLICATION THEREOF

(71) Applicant: Zhejiang Third Age Material Technology Co., Ltd., Huzhou (CN)

(72) Inventors: Shuzhen Chen, Huzhou (CN); Rui Li, Huzhou (CN)

(73) Assignee: Zhejiang Third Age Material Technology Co., Ltd., Huzhou (CN)

( * ) Notice: Subject to any disclaimer, the term of this patent is extended or adjusted under 35 U.S.C. 154(b) by 94 days.

(21) Appl. No.: 17/435,584

(22) PCT Filed: Mar. 12, 2019

(86) PCT No.: PCT/CN2019/077839
§ 371 (c)(1),
(2) Date: Sep. 1, 2021

(87) PCT Pub. No.: WO2020/181490
PCT Pub. Date: Sep. 17, 2020

(65) Prior Publication Data
US 2022/0153599 A1    May 19, 2022

(51) Int. Cl.
*C01B 33/18* (2006.01)

(52) U.S. Cl.
CPC ........ *C01B 33/183* (2013.01); *C01P 2004/32* (2013.01); *C01P 2004/61* (2013.01)

(58) Field of Classification Search
CPC ....... C01B 33/183; C01B 33/12; C01B 33/18; C01P 2004/32; C01P 2004/61; Y02E 30/30; C08K 3/013; C08K 3/36
See application file for complete search history.

(56) References Cited

U.S. PATENT DOCUMENTS

| | | | |
|---|---|---|---|
| 4,979,973 A * | 12/1990 | Takita | C03C 3/06 501/12 |
| 2012/0288716 A1* | 11/2012 | Ueda | C01B 33/157 428/406 |

FOREIGN PATENT DOCUMENTS

| | | | |
|---|---|---|---|
| CN | 101172610 A | * | 5/2008 |
| CN | 105384177 A | | 3/2016 |
| CN | 106335905 A | | 1/2017 |
| CN | 106348306 A | | 1/2017 |
| WO | 2017170534 A1 | | 10/2017 |

OTHER PUBLICATIONS

Machine translation of CN-101172610-A (Year: 2006).*

* cited by examiner

*Primary Examiner* — Colin W. Slifka
*Assistant Examiner* — Logan Edward Laclair
(74) *Attorney, Agent, or Firm* — Olive Law Group, PLLC

(57) ABSTRACT

The present invention relates to a method for preparing a spherical silica powder filler, comprising the following steps: performing hydrolytic condensation on an organic silicon compound to obtain polysiloxane precipitate, wherein the organic silicon compound comprises silane having the chemical formula of $(R_1)_a(R_2)_b(R_3)_c(Si(X)_d$, wherein $R_1$, $R_2$, and $R_3$ are independently selected C1-18 hydrocarbyl groups or hydrogen atoms; X is a hydrolysable functional group; a, b, and c are 0, 1, 2, or 3; d is 1, 2, 3, or 4; and a+b+c+d=4; smashing and drying the polysiloxane precipitate to obtain siloxane angular powder; and melting and spherifying the siloxane angular powder into the spherical silica powder filler. The present invention also provides a spherical silica powder filler obtained by the method and an application thereof. The present invention takes the organic silicon compound as the starting material, and the resulting spherical silica powder filler does not contain radioactive elements such as uranium and thorium, and therefore, the requirement of low radioactivity is satisfied.

14 Claims, No Drawings

METHOD FOR PREPARING SPHERICAL SILICA POWDER FILLER, AND RESULTING SPHERICAL SILICA POWDER FILLER AND APPLICATION THEREOF

This application is a 371 of international PCT/CN2019/077839, filed on Mar. 12, 2019, the contents of each of which are hereby incorporated by reference.

BACKGROUND OF THE INVENTION

1. Field of the Invention

The invention relates to the packaging of semiconductors, and more specifically to a method for preparing a spherical silica powder filler, and a resulting spherical silica powder filler and an application thereof.

2. Related Art

During the packaging of the semiconductor back-end process, packaging materials such as molding compounds, patch glues, underfill materials and chip carriers are required. In addition, when assembling passive components, semiconductor components, electro-acoustic devices, display devices, optical devices and radio frequency devices into equipments, circuit boards such as high-density interconnects (HDI), high-frequency high-speed boards, and motherboards are also required. These packaging materials and circuit boards are mainly composed of fillers and organic polymers such as epoxy resin, aromatic polyether and fluororesin. The filler is mainly spherical or angular silica, whose function is to reduce the coefficient of thermal expansion of the organic polymers. In order to reduce the viscosity of the filler and increase the filling rate, the spherical or angular silica is tightly packed and graded to provide the existing filler.

With the rapid development of the microelectronics industry, for the large-scale or super-large scale integrated circuits and high-end copper clad laminates, the requirement of the filler is getting higher and higher. For example, the requirement of low radioactivity is needed. At present, natural quartz ore is selected, purified by pickling, smashed, melted and spheroidized to provide the spherical silica. Therefore, the purity of the spherical silica largely depends on the purity of the natural mineral itself and cannot meet the requirements of low radioactivity.

SUMMARY OF THE INVENTION

In order to solve the problem of uncontrollable radioactivity caused by the fact that the purity of the filler largely depends on the natural mineral in the prior art, the present invention aims to provide a method for preparing a spherical silica powder filler, and a resulting spherical silica powder filler and an application thereof.

The present invention provides a method for preparing a spherical silica powder filler, comprising the following steps: S1, performing hydrolytic condensation on an organic silicon compound to obtain polysiloxane precipitate, wherein the organic silicon compound comprises silane having the chemical formula of $(R_1)_a(R_2)_b(R_3)_c Si(X)_d$, wherein $R_1$, $R_2$, and $R_3$ are independently selected C1-18 hydrocarbyl groups or hydrogen atoms; X is a hydrolysable functional group; a, b, and c are 0, 1, 2, or 3; d is 1, 2, 3, or 4; and a+b+c+d=4; S2, smashing and drying the polysiloxane precipitate to obtain siloxane angular powder; and S3, melting and spherifying the siloxane angular powder into the spherical silica powder filler.

In step S1, the organic silicon compound reacts with water to obtain the polysiloxane precipitate. In a preferred embodiment, the organic silicon compound is added dropwise to deionized water to obtain the polysiloxane precipitate. More preferably, the organic silicon compound is added dropwise to the stirring deionized water to obtain the polysiloxane precipitate. In a preferred embodiment, the weight ratio of organic silicon compound to water is 1:10.

Preferably, in the chemical formula of the silane in the organic silicon compound, $R_1$, $R_2$, and $R_3$ are all methyl, and X is a chlorine atom, that is, the silane is trimethylchlorosilane. Preferably, in the chemical formula of the silane in the organic silicon compound, $R_1$ is methyl, b and c are both 0, and X is a chlorine atom, that is, the silane is methyltrichlorosilane, and the resulting polysiloxane precipitate is methylsiloxane polymer precipitates. Preferably, the organic silicon compound consists entirely of methyltrichlorosilane. In a preferred embodiment, the organic silicon compound is methyltrichlorosilane containing oligomers. In a preferred embodiment, the organic silicon compound is composed of 80% by weight of methyltrichlorosilane, 10% by weight of tetrachlorosilane, 5% by weight of dimethyldichlorosilane and 5% by weight of trimethylchlorosilane. In a specific embodiment, the organic silicon compound may further comprise silica with a uranium content of not more than 1 ppb. In a preferred embodiment, the organic silicon compound consists of 90% by weight of methyltrichlorosilane and 10% by weight of fumed silica.

In step S2, the polysiloxane precipitate is smashed, filtered, washed with water and dried to obtain the siloxane angular powder. In a specific embodiment, the polysiloxane precipitate is smashed with a high-speed shearer to obtain a slurry of polysiloxane powder, and the slurry is filtered, washed with deionized water to neutrality, and then dried to obtain the siloxane angular powder. In a preferred embodiment, drying is performed at 120 degrees for 3 hours to obtain the siloxane angular powder.

Preferably, the siloxane angular powder has an average particle size of 0.3-70 microns. In a preferred embodiment, the siloxane angular powder has an average particle size of 5 microns.

In step S3, the siloxane angular powder is melted and spheroidized after removing of organic component in polysiloxane. Preferably, the temperature for removing of organic component in polysiloxane is 400° C.-600° C. In a preferred embodiment, the temperature for removing of organic component in polysiloxane is 450° C. Preferably, the time for removing of organic component in polysiloxane is 4 hours-24 hours. In a preferred embodiment, the time for removing of organic component in polysiloxane is 6 hours.

Preferably, the siloxane angular powder is thrown into a flame at 1800° C. or higher to perform melt and spheroidization. In a specific embodiment, the siloxane angular powder is thrown into a burner with a flame temperature of 2000 degrees or more to perform melt and spheroidization.

Preferably, in step S3, coarse oversize particles above 75 microns in the spherical silica powder filler are removed by a dry or wet sieving or inertial classification. Preferably, coarse oversize particles above 55 microns in the spherical silica powder filler are removed. Preferably, coarse oversize particles above 45 microns in the spherical silica powder filler are removed. Preferably, coarse oversize particles above 20 microns in the spherical silica powder filler are removed. Preferably, coarse oversize particles above 10 microns in the spherical silica powder filler are removed.

Preferably, coarse oversize particles above 5 microns in the spherical silica powder filler are removed. Preferably, coarse oversize particles above 3 microns in the spherical silica powder filler are removed. Preferably, coarse oversize particles above 1 micron in the spherical silica powder filler are removed.

The present invention also provides a spherical silica powder filler obtained according to the above-mentioned method, wherein the spherical silica powder filler has a uranium content of not more than 1 ppb. Preferably, the spherical silica powder filler has a uranium content of not higher than 0.9 ppb. More preferably, the spherical silica powder filler has a uranium content of not higher than 0.7 ppb. More preferably, the spherical silica powder filler has a uranium content of not higher than 0.5 ppb. Most preferably, the spherical silica powder filler has a uranium content of less than 0.3 ppb.

Preferably, the spherical silica powder filler has an average particle size of 0.1-70 microns. More preferably, the spherical silica powder filler has an average particle size of 0.5-67 microns. In a preferred embodiment, the spherical silica powder filler has an average particle size of 6 microns. In a preferred embodiment, the spherical silica powder filler has an average particle size of 7 microns.

The present invention also provides an application of the above-mentioned spherical silica powder filler, wherein the spherical silica powder filler of different particle sizes is tightly packed and graded in resin to form a composite material. Preferably, the composite material is suitable for semiconductor packaging materials, circuit boards and intermediate semi-finished products thereof. Preferably, the packaging material is molding compound, patch glue, underfill material, or chip carrier. The molding compound is DIP package molding compound, SMT package molding compound, MUF, FO-WLP, FCBGA molding compound. Preferably, the circuit board is an HDI, a high-frequency high-speed board, or a motherboard.

According to the method for preparing a spherical silica powder filler, which takes the organic silicon compound as the starting material, without involving the conventionally used angular crushed quartz and other natural minerals, and can be refined by industrial methods such as distillation, and the resulting spherical silica powder filler does not contain radioactive elements such as uranium and thorium, and therefore, the requirement of low radioactivity is satisfied. In addition, the synthesis parameters of the method of the present invention can be appropriately adjusted to produce the spherical silica powder filler with a particle size of 0.1-70 microns.

DESCRIPTION OF THE ENABLING EMBODIMENT

The preferred embodiments of the present invention are given below and described in detail.

The detection methods involved in the following embodiments include:

The average particle size was measured by a laser particle size distribution instrument HORIBA LA-700, and the solvent was isopropanol.

The content of uranium was measured by Agilent 7700X ICP-MS. The sample was prepared by total dissolution in hydrofluoric acid after burning at 800 degrees.

Embodiment 1

100 parts by weight of methyltrichlorosilane was added dropwise to 1000 parts by weight of deionized water while stirring to obtain a white precipitated methylsiloxane polymer. The precipitate was smashed with a high-speed shearer to obtain a slurry of methylsiloxane polymer powder with an average particle size of 5 microns. The slurry was filtered, washed with deionized water to neutrality, and then dried at 120 degrees for 3 hours to obtain a methylsiloxane angular powder with an average particle size of 5 microns. The powder was heated to remove of organic component in polysiloxane under different temperature and time conditions, and then sent into a burner with a flame temperature of 2000 degrees or more to perform melt and spheroidization. All the powders were collected with a dust bag to obtain a spherical silica powder sample. The analysis results of the samples were listed in Table 1. The spherical silica of Example 1 without removing of organic component in polysiloxane was brown, and the ones with removing of organic component in polysiloxane were all white spherical silica.

TABLE 1

| | Average Particle Size of Polysiloxane Powder μm | Temperature for Removing of organic component in polysiloxane °C. | Time for Removing of organic component in polysiloxane hours | Average Particle Size of Spherical Silica μm | Uranium Content of Spherical Silica ppb |
|---|---|---|---|---|---|
| Example 1 | 5 | without removing of organic component in polysiloxane | | 6* | <0.3 |
| Example 2 | 5 | 400 | 24 | 6 | <0.3 |
| Example 3 | 5 | 450 | 6 | 6 | <0.3 |
| Example 4 | 5 | 500 | 4 | 6 | <0.3 |
| Example 5 | 5 | 600 | 4 | 6 | <0.3 |

*The color of the powder is brown.

Embodiment 2

100 parts by weight of methyltrichlorosilane was added dropwise to 1000 parts by weight of deionized water while stirring to obtain a white precipitated methylsiloxane polymer. The precipitate was smashed with a high-speed shearer to obtain a slurry of methylsiloxane polymer powder with different average particle sizes. The slurry was filtered, washed with deionized water to neutrality, and then dried at 120 degrees for 3 hours to obtain a methylsiloxane angular powder. The powder was heated to remove of organic component in polysiloxane at 450 degrees for 6 hours, and then sent into a burner with a flame temperature of 2000 degrees or more to perform melt and spheroidization. All the powders were collected with a dust bag to obtain a spherical silica powder sample. The analysis results of the samples were listed in Table 2.

TABLE 2

| | Average Particle Size of Polysiloxane Powder μm | Temperature for Removing of organic component in polysiloxane °C. | Time for Removing of organic component in polysiloxane hours | Average Particle Size of Spherical Silica μm | Uranium Content of Spherical Silica ppb |
|---|---|---|---|---|---|
| Example 6 | 0.3 | 450 | 6 | 0.5 | <0.3 |

TABLE 2-continued

| | Average Particle Size of Polysiloxane Powder μm | Temperature for Removing of organic component in polysiloxane °C. | Time for Removing of organic component in polysiloxane hours | Average Particle Size of Spherical Silica μm | Uranium Content of Spherical Silica ppb |
|---|---|---|---|---|---|
| Example 7 | 1 | 450 | 6 | 1.8 | <0.3 |
| Example 8 | 10 | 450 | 6 | 10 | <0.3 |
| Example 9 | 30 | 450 | 6 | 29 | <0.3 |
| Example 10 | 70 | 450 | 6 | 67 | <0.3 |

Embodiment 3

A mixture of 80 parts by weight of methyltrichlorosilane, 10 parts by weight of tetrachlorosilane, 5 parts by weight of dimethyldichlorosilane and 5 parts by weight of trimethylchlorosilane was added dropwise to 1000 parts by weight of deionized water while stirring to obtain a white precipitated methylsiloxane polymer. The precipitate was smashed with a high-speed shearer to obtain a slurry of methylsiloxane polymer powder with an average particle size of 5 microns. The slurry was filtered, washed with deionized water to neutrality, and then dried at 120 degrees for 3 hours to obtain a methylsiloxane angular powder with an average particle size of 5 microns. The powder was heated to remove of organic component in polysiloxane at 450 degrees for 6 hours, and then sent into a burner with a flame temperature of 2000 degrees or more to perform melt and spheroidization. All the powders were collected with a dust bag to obtain a spherical silica powder sample. The analysis results of the sample were listed in Table 3.

TABLE 3

| | Average Particle Size of Polysiloxane Powder μm | Temperature for Removing of organic component in polysiloxane °C. | Time for Removing of organic component in polysiloxane hours | Average Particle Size of Spherical Silica μm | Uranium Content of Spherical Silica ppb |
|---|---|---|---|---|---|
| Example 11 | 5 | 450 | 6 | 6 | 0.5 |

Embodiment 4

100 parts by weight of methyltrichlorosilane containing oligomers was added dropwise to 1000 parts by weight of deionized water while stirring to obtain a white precipitated methylsiloxane polymer. The precipitate was smashed with a high-speed shearer to obtain a slurry of methylsiloxane polymer powder with an average particle size of 5 microns. The slurry was filtered, washed with deionized water to neutrality, and then dried at 120 degrees for 3 hours to obtain a methylsiloxane angular powder with an average particle size of 5 microns. The powder was heated to remove of organic component in polysiloxane at 450 degrees for 6 hours, and then sent into a burner with a flame temperature of 2000 degrees or more to perform melt and spheroidization. All the powders were collected with a dust bag to obtain a spherical silica powder sample. The analysis results of the sample were listed in Table 4.

TABLE 4

| | Average Particle Size of Polysiloxane Powder μm | Temperature for Removing of organic component in polysiloxane °C. | Time for Removing of organic component in polysiloxane hours | Average Particle Size of Spherical Silica μm | Uranium Content of Spherical Silica ppb |
|---|---|---|---|---|---|
| Example 12 | 5 | 450 | 6 | 6 | 0.7 |

Embodiment 5

A mixture of 90 parts by weight of methyltrichlorosilane and 10 parts by weight of fumed silica was added dropwise to 1000 parts by weight of deionized water while stirring to obtain a white precipitated methylsiloxane polymer. The precipitate was smashed with a high-speed shearer to obtain a slurry of methylsiloxane polymer powder with an average particle size of 5 microns. The slurry was filtered, washed with deionized water to neutrality, and then dried at 120 degrees for 3 hours to obtain a methylsiloxane angular powder with an average particle size of 5 microns. The powder was heated to remove of organic component in polysiloxane at 450 degrees for 6 hours, and then sent into a burner with a flame temperature of 2000 degrees or more to perform melt and spheroidization. All the powders were collected with a dust bag to obtain a spherical silica powder sample. The analysis results of the sample were listed in Table 5.

TABLE 5

| | Average Particle Size of Polysiloxane Powder μm | Temperature for Removing of organic component in polysiloxane °C. | Time for Removing of organic component in polysiloxane hours | Average Particle Size of Spherical Silica μm | Uranium Content of Spherical Silica ppb |
|---|---|---|---|---|---|
| Example 13 | 5 | 450 | 6 | 6 | 0.9 |

The foregoing description refers to preferred embodiments of the present invention, and is not intended to limit the scope of the present invention. Various changes can be made to the foregoing embodiments of the present invention. That is to say, all simple and equivalent changes and modifications made in accordance with the claims of the present invention and the content of the description fall into the protection scope of the patent of the present invention. What is not described in detail in the present invention is conventional technical content.

What is claimed is:

1. A method for preparing a spherical silica powder filler, comprising the following steps:
   S1, an organic silicon compound is added to deionized water to obtain polysiloxane precipitate, wherein the organic silicon compound comprises silane having the chemical formula of $(R1)a(R2)b(R3)cSi(X)d$, wherein R1, R2, and R3 are independently selected C1-18 hydrocarbyl groups or hydrogen atoms; X is a chlorine atom; a, b, and c are 0, 1, 2, or 3; d is 1, 2, or 3; and a+b+c+d=4;
   S2, smashing to obtain a slurry of polysiloxane powder, and the slurry is filtered, washed with deionized water to neutrality, and then dried to obtain the siloxane angular powder; and S3, removing of organic component in the siloxane angular powder at 400° C.-600° C., S4, melting and spherifying the siloxane angular powder into the spherical silica powder filler, wherein the spherical silica powder filler has a uranium content of not more than 1 ppb;

said spherical silica powder filler is used in packaging materials and circuit boards.

2. The method according to claim 1, wherein the organic silicon compound further comprises silica with a uranium content of not more than 1 ppb.

3. The method according to claim 1, wherein the siloxane angular powder is thrown into a burner with a flame temperature of 2000° C. or more to perform melt and spheroidization.

4. The method according to claim 1, wherein coarse oversize particles above 1 micron in the spherical silica powder filler are removed by a dry or wet sieving or inertial classification.

5. The method according to claim 1, wherein the spherical silica powder filler has an average particle size of 0.1-70 microns.

6. The method according to claim 5, further comprising the step of tightly packing the spherical silica powder filler; and grading the spherical silica powder filler in resin to form a composite material.

7. The method according to claim 6, wherein the composite material is suitable for semiconductor packaging materials, circuit boards and intermediate semi-finished products thereof.

8. The method according to claim 1, wherein coarse oversize particles above 3 microns in the spherical silica powder filler are removed by a dry or wet sieving orinertial classification.

9. The method according to claim 1, wherein coarse oversize particles above 5 microns in the spherical silica powder filler are removed by a dry or wet sieving orinertial classification.

10. The method according to claim 1, wherein coarse oversize particles above 10 microns in the spherical silica powder filler are removed by a dry or wet sieving orinertial classification.

11. The method according to claim 1, wherein coarse oversize particles above 20 microns in the spherical silica powder filler are removed by a dry or wet sieving orinertial classification.

12. The method according to claim 1, wherein coarse oversize particles above 45 microns in the spherical silica powder filler are removed by a dry or wet sieving orinertial classification.

13. The method according to claim 1, wherein coarse oversize particles above 55 microns in the spherical silica powder filler are removed by a dry or wet sieving orinertial classification.

14. The method according to claim 1, wherein coarse oversize particles above 75 microns in the spherical silica powder filler are removed by a dry or wet sieving orinertial classification.

* * * * *